United States Patent [19]

Tokita et al.

[11] Patent Number: 4,662,804
[45] Date of Patent: May 5, 1987

[54] AUTOMATIC CHAMFERING MACHINE

[75] Inventors: Mamoru Tokita, Tokyo; Takeji Nakano, Chiba, both of Japan

[73] Assignee: Kabushikigaisha Iwasa Tekkosho, Tokyo, Japan

[21] Appl. No.: 853,004

[22] Filed: Apr. 17, 1986

[30] Foreign Application Priority Data

Apr. 22, 1985 [JP] Japan ................................. 60-85672

[51] Int. Cl.$^4$ ............................................ B23F 19/10
[52] U.S. Cl. ....................................... 409/8; 51/241 S; 51/287
[58] Field of Search .................... 409/140, 175, 180, 8, 409/9; 51/241 S, 241 B, 244, 247, 105.66, 123 G, 287 S

[56] References Cited

U.S. PATENT DOCUMENTS

| 1,511,213 | 10/1924 | Arnold | 409/8 |
| 3,782,041 | 1/1974 | Batorski | 51/287 S X |
| 4,012,990 | 3/1977 | Wagner | 409/8 |
| 4,265,575 | 5/1981 | Erhardt et al. | 409/8 |

FOREIGN PATENT DOCUMENTS

| 740155 | 10/1943 | Fed. Rep. of Germany | 409/8 |
| 43389 | 4/1979 | Japan | 51/241 S |
| 90225 | 7/1980 | Japan | 409/8 |
| 186524 | 10/1983 | Japan | 409/8 |
| 7145 | of 1915 | United Kingdom | 409/8 |
| 585050 | 12/1917 | U.S.S.R. | 51/241 S |

Primary Examiner—William R. Briggs
Attorney, Agent, or Firm—Murray Schaffer

[57] ABSTRACT

An automatic chamfering machine for chamfering the edge of teeth of internal gears or edge of slots of ring-like clutches is disclosed. Once the machine is set on the work (i.e., an internal gear or a ring-like clutch), it can be intermittently moved along the work at an interval corresponding to one tooth or slot to effect chamfering.

The automatic chamfering machine according to the invention has at least one drive roller, which is held attracted to the work through excitation of a solenoid so that the machine will not fall from the work. The chamfering machine is moved along the work to an extent corresponding to one tooth, for instance, with the rotation of the drive roller attracted to the work to be automatically stopped at the next chamfering position. Then, a cutter is moved along the tooth surface while being rotated to effect chamfering. When chamfering for one tooth is completed, the drive roller is moved along the work to an extent corresponding to one tooth to be stopped at the next chamfering position. The cutter then is again moved along the tooth surface while being rotated to effect chamfering. This operation is repeatedly to effect chamfering of all the teeth.

1 Claim, 13 Drawing Figures

4,662,804

AUTOMATIC CHAMFERING MACHINE

FIELD OF THE INVENTION

This invention relates to an automatic chamfering machine for automatically chamfering the edge of teeth B of an internal gear (i.e., work) A shown in FIG. 1 (along points a, b, c and d), for instance.

PRIOR ART

Usually, teeth of large gears with diameters of 500 to 4,000 mm or slots of ring-like clutches are formed using large size gear cutters or slotting machines. The teeth B or slots thus formed have sharply pointed edge. If such gear or clutch is used directly, cracks or fissures are liable to result. Usually, therefore, the edge of the teeth B is chamfered using a chamfering machine.

With the prior art chamfering machine, the work is set horizontally on an operating table and is clamped. The work is then processed for chamfering by being intermittently rotated horizontally at a predetermined pitch.

PROBLEMS IN THE PRIOR ART

The prior art chamfering machine, however, has the following problems.

(1) If the work is not horizontally set on the operating table, there occurs a vertical swing of the side surface of the gear with respect to the cutter, resulting in fluctuations of the chamfering width. In some cases, the side surface of the gear is detached from the chamfering tool to disable chamfering. For this reason, it is necessary to set the work on the operating table accurately horizontally. However, to do so is very difficult and requires considerable skill.

(2) To rotate a large gear on the operating table, a large driver is necessary. The chamfering machine inevitably is increased in size, so that it is heavy and inconvenient to handle as well as being expensive.

(3) The cutting tool of the chamfering machine is moved in conformity to the tooth shape under control of a microcomputer or the like. Therefore, with a complicated tooth shape the control is complicated, and it is difficult to produce a control program. Further, in case where a large number of different kinds of works are processed in small quantities, it is necessary to produce a program for each kind of works. This means that enormous time and expenditures are required for producing programs, thus leading to a high cost of chamfering.

(4) The prior art chamfering machine can be used for processing only circular works and cannot be used for works, in which the distance from the center to the outer periphery is not fixed such as elliptical works. Therefore, such non-circular works have to be chamfered by manual operation.

OBJECT OF THE INVENTION

An object of the invention is to provide an automatic chamfering machine, which can be automatically moved to perform chamfering of a work automatically once the work is set on it.

Another object of the invention is to provide an automatic chamfering machine, with which a chamfering cutter can be moved faithfully along the tooth surface to effect accurate chamfering even if the tooth shape of the work or shape or slot is complicated, and which can perform automatic chamfering of even non-circular works.

SUMMARY OF THE INVENTION

The automatic chamfering machine 1 according to the invention is set on the work A as shown in FIG. 1 when it is used. In this state, drive rollers 2a and 2b shown in FIGS. 5 and 6 are held attracted to the work A by excitation of solenoids 3a and 3b as shown in FIG. 6. With this attraction, the machine will not fall from the work A.

The automatic chamfering machine 1 according to the invention is intermittently moved at a pitch corresponding to the tooth pitch along the work A with the rotation of the drive rollers 2a and 2b attracted to the work A. It is stopped at a chamfering position. In this state, a cutter 4 shown in FIG. 4 is driven so that it is moved along the tooth surface C of the work while being rotated to effect chamfering of a tooth. When the chamfering for one tooth is completed, the automatic chamfering machine 1 is automatically moved along the work A to an extent corresponding to one tooth to be stopped at the next chamfering position. At this position, the cutter 4 is driven again for movement along the tooth surface C of the work while being rotated to effect chamfering. This operation is repeatedly performed to effect chamfering of all the teeth.

DETAILED DESCRIPTION OF THE PREFERRED EMBODIMENT (Constitution)

Figure 4:
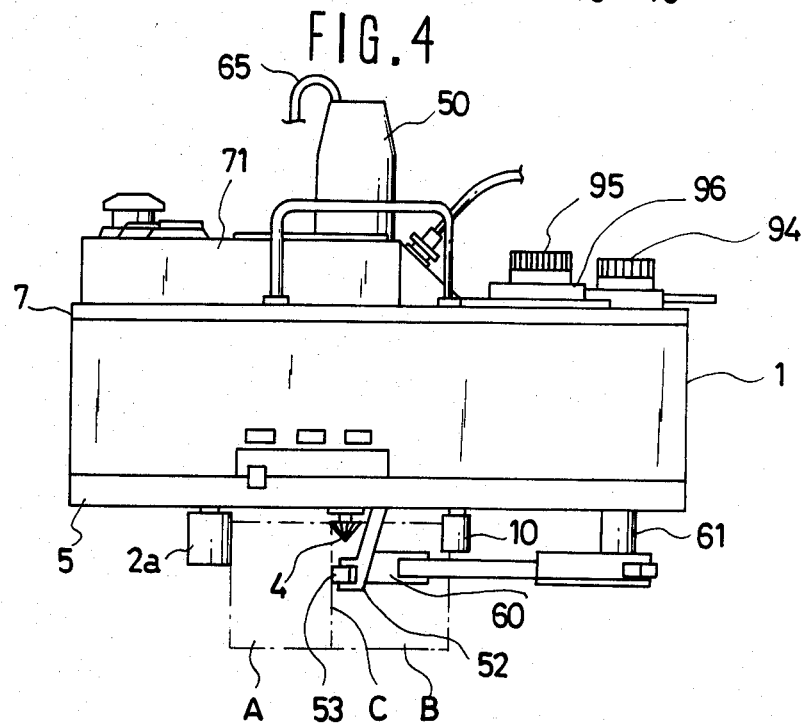
FIG. 4 is a side view showing the same chamfering machine.
Figure 5:
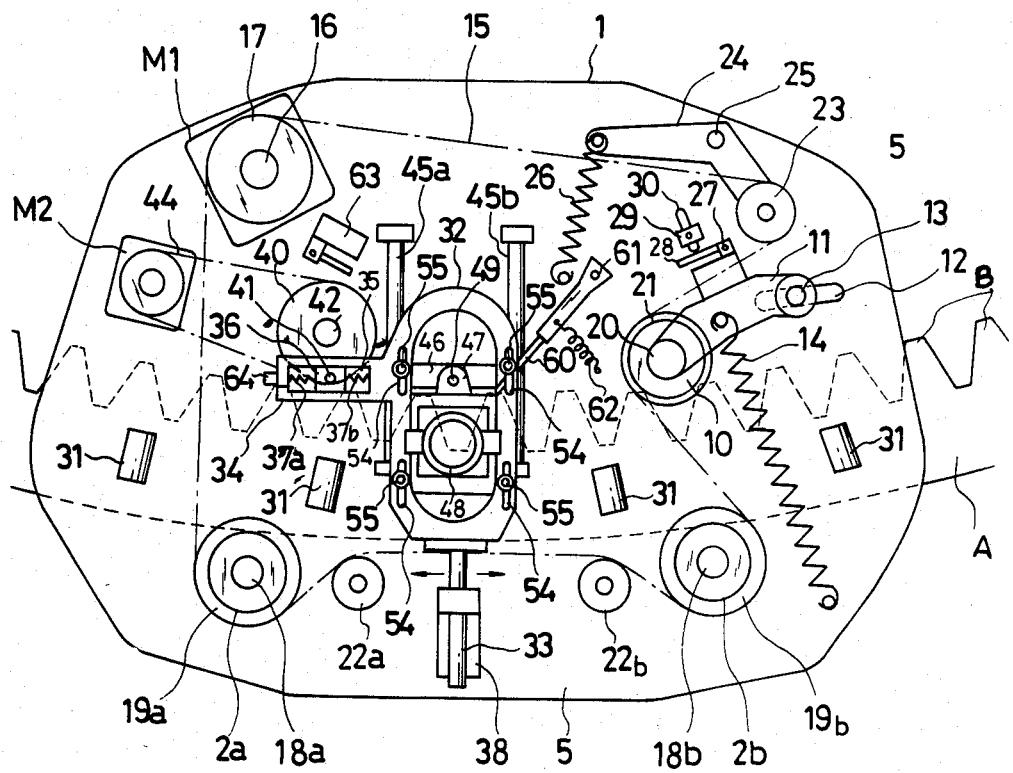
FIG. 5 is a schematic plan view showing the same chamfering machine with a cover removed.
Figure 6:
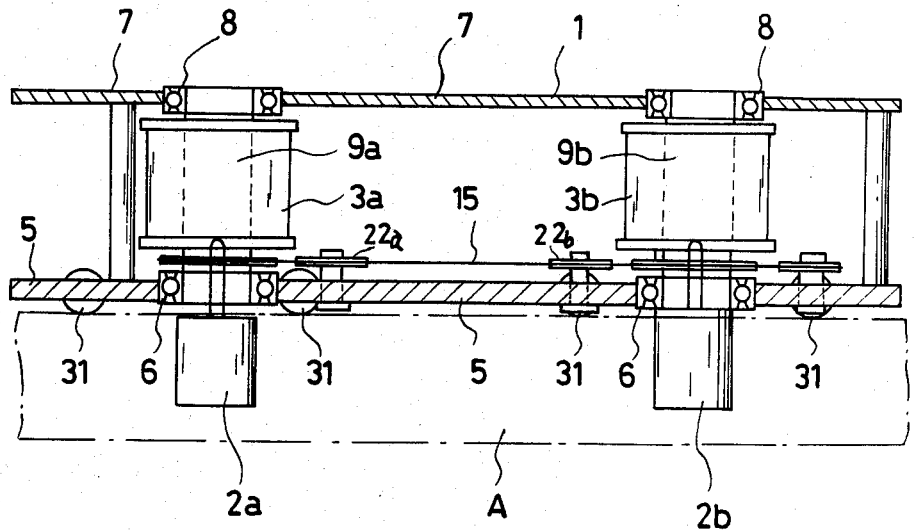
FIG. 6 is a longitudinal sectional view showing the same chamfering machine.

Designated at 2a and 2b in FIGS. 4 to 6 are drive rollers. As shown in FIG. 6, the drive rollers 2a and 2b are each rotatably mounted between a bearing 6 mounted in a main frame 5 and a bearing 8 mounted in a cover 7. Shafts 9a and 9b of the drive rollers 2a and 2b (FIG. 6) also serve as cores of solenoids 3a and 3b. When the solenoids 3a and 3b are excited, magnetic forces are generated in the drive rollers 2a and 2b, so that these rollers 2a and 2b are attracted to the upper periphery of a work A. With this attraction, the automatic chamfering machine 1 is held attracted to and will not fall from the work A.

Designated at 10 in FIGS. 4 and 5 is a positioning roller made of rubber or plastics. As shown in FIG. 5, the positioning roller 10 is rotatably mounted in a swing arm 11. The swing arm 11 is rotatably mounted by a pin 13 in a slot 12 formed in the main frame 5. The position of mounting of the positioning roller 10 can be adjusted according to the pitch of teeth B by molding the pin 13 along the slot 12. The swing arm 11 is biased by a spring 14 toward the teeth B of the work so that the positioning roller 10 is held in forced contact with the teeth B.

When a machine moving motor M1 is rotated, the drive rollers 2a and 2b and positioning roller 10 shown in FIG. 5 are rotated via a chain 15, so that the automatic chamfering machine 1 is moved intermittently at a pitch corresponding to the tooth pitch.

The chain 15, as shown in FIG. 5, is passed round a sprocket 17 mounted on the shaft 16 of the machine moving motor M1, a sprocket 9a mounted on the shaft 18a of the drive roller 2a, idler sprockets 22a and 22b, a sprocket 19b mounted on the shaft 18b of the drive roller 2b, the sprocket 21 mounted on the shaft 20 of the positioning roller 10 and a tension idler sprocket 23.

The tension idler sprocket 23 is mounted on a swing arm 24, as shown in FIG. 5. As shown in FIG. 5, the swing arm 24 is rotatably mounted by a pin 25 on the main frame 5. The swing arm 24 is spring biased by a spring 26 to outwardly urge and give a tension in the chain 15 with the tension idler sprocket 23.

Designated at 27 in FIG. 5 is a limit switch. The limit switch 27 is mounted on the swing arm 11 carrying the positioning roller 10. It has a movable contact piece 28, which is adapted to be brought into contact with and flapped by a dog 29 when the positioning roller 10 gets out of a tooth B of the work. When the movable contact piece 28 is flapped, a signal for turning off the power source of the machine moving motor M1 is generated after the lapse of a subsequent time (e.g., 0.2 to 0.5 sec.) preset in a timer 80.

The dog 29 is mounted in a slot 30 formed in the main frame 5. The dog 29 thus can be moved along the slot 30 toward or away from the limit switch 27. In this way, the position of the dog 29 can be adjusted according to the width of the work A.

Designated at 31 in FIGS. 5 and 6 are rollers. These rollers 31 are rotatably mounted in the main frame 5. As shown in FIG. 6, these rollers 31 downwardly project from the bottom of the main frame 5 and are in contact with the upper surface of the work A, thus permitting smooth movement of the automatic chamfering machine 1.

Figure 8:
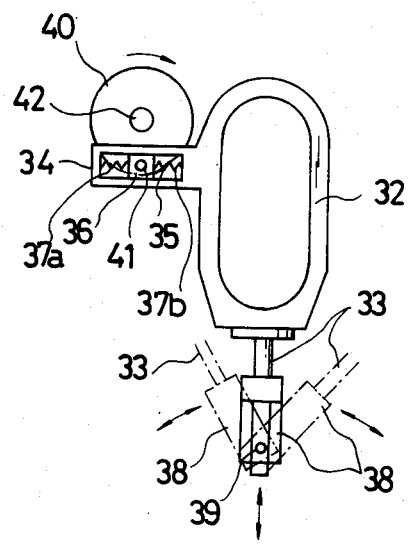
Figure 13:
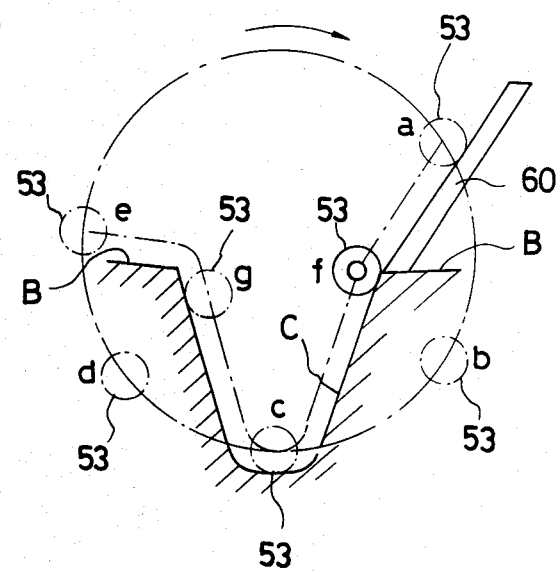
FIG. 13 is a view showing the orbit of movement of a guide roller of the same chamfering machine.

Designated at 32 in FIG. 5 is a crank frame. The crank frame 32 serves to permit the guide roller 53 to be moved along the tooth surface C of the work as shown in FIG. 13. The crank frame, as shown in FIG. 8, has an elongated annular shape, and it is provided at a longitudinal end with a coupling rod 33 and is also provided with an integral coupling section 34 extending sidewise. The coupling section 34 has a guide groove 35, in which a connection piece 36 is received for reciprocal movement along it. The connection piece 36 is spring biased on both sides by springs 37a and 37b. More specifically, the connection piece 36 is inwardly spring biased by the springs 37a and 37b to be held at a longitudinally central position in the guide groove 35.

Figure 9:
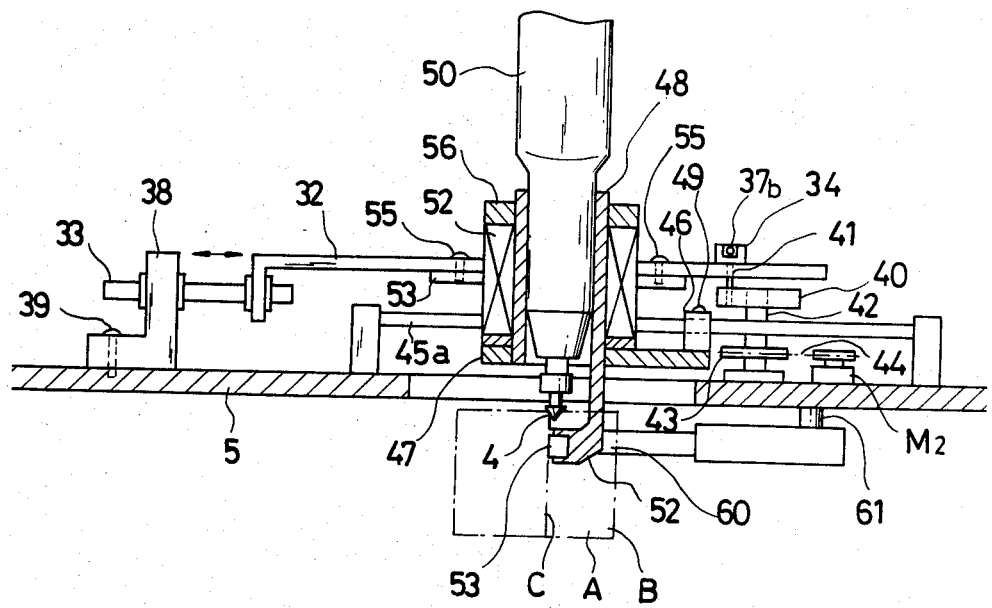
FIG. 9 is a schematic longitudinal sectional view showing the cutter drive mechanism of the same chamfering machine.
Figure 10:
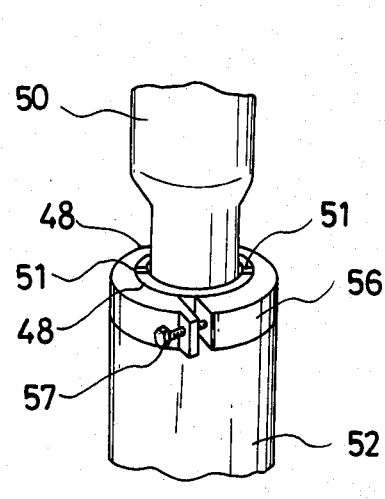
FIG. 10 is a perspective view showing a chamfering tool mounted in a cutter holder.

The coupling rod 33, as shown in FIGS. 8 and 9, is slidably inserted in an L-shaped support member 38. The L-shaped support member 38 is coupled by a pin 39 to the main frame 5 such that it can swing to the left and right as shown in FIG. 8.

The coupling section 34, as shown in FIGS. 5 and 8, is mounted by a pin 41 on a crank wheel 40 at an excentric position thereof. Thus, the crank frame 32 can be rotated with the rotation of the crank wheel 40.

The shaft 24 of the crank wheel 40, as shown in FIGS. 5 and 9, is rotatably mounted in the main frame 5. A sprocket 43 is mounted on the shaft 42. A chain 44 is passed round the sprocket 43 and a sprocket provided on a cutter moving motor M2 shown in FIG. 5. The crank wheel 40 is thus rotated with the rotation of the cutter moving motor M2.

Figure 7:
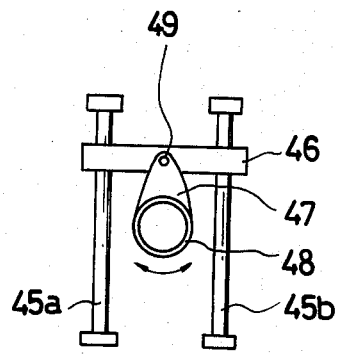
FIGS. 7 and 8 are schematic plan views showing disassembled components of a cutter drive mechanism of the same chamfering machine.

Designated at 45a and 45b in FIGS. 5 and 7 are parallel guide bars which are secured to the main frame 5.

Designated at 46 in FIGS. 5 and 7 is a beam mounted between the two guide bars 45a and 45b such that it is slidable therealong.

Figure 11:
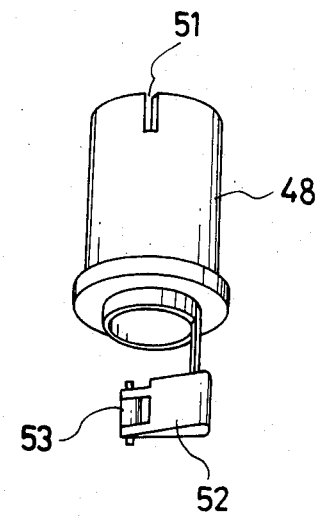
FIG. 11 is a perspective view showing a cutter holder of the same chamfering machine.

Designated at 47 in FIG. 7 is a holder support. The holder support 47 supports a holder 48 as shown in FIG. 11. As shown in FIGS. 7 and 9, the holder support 47 is pivoted by a pin 49 to the beam 46 for swinging in the directions of arrows shown in FIG. 7.

Figure 1:
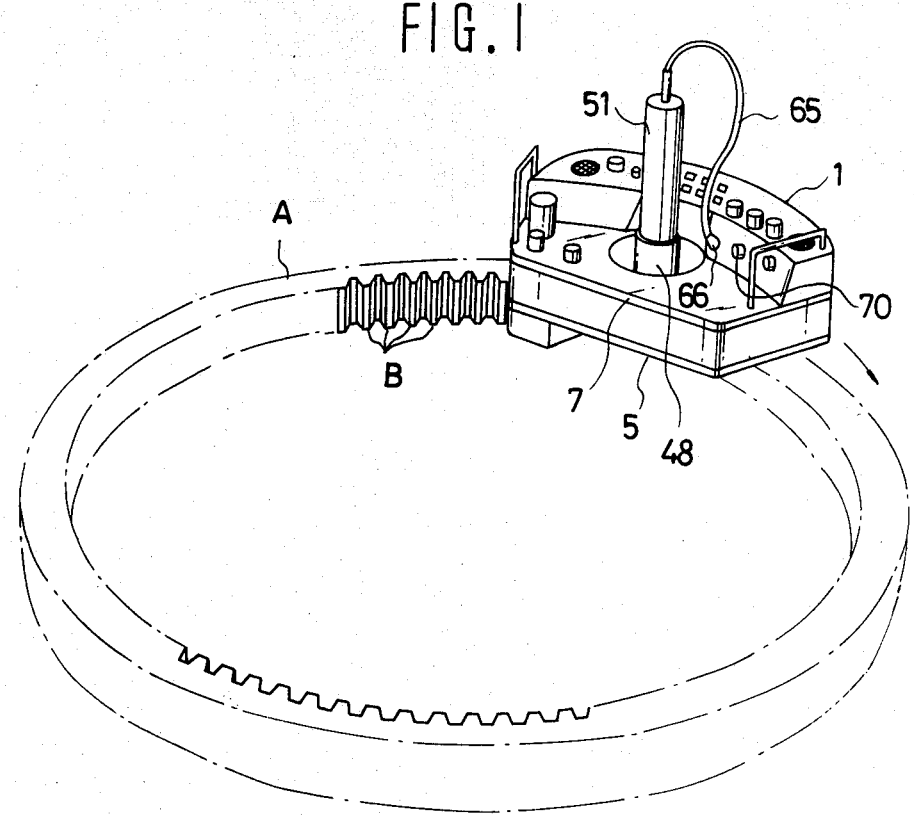
FIGS. 1 and 2 are schematic perspective views showing an example of use of an automatic chamfering machine according to the invention.
Figure 2:
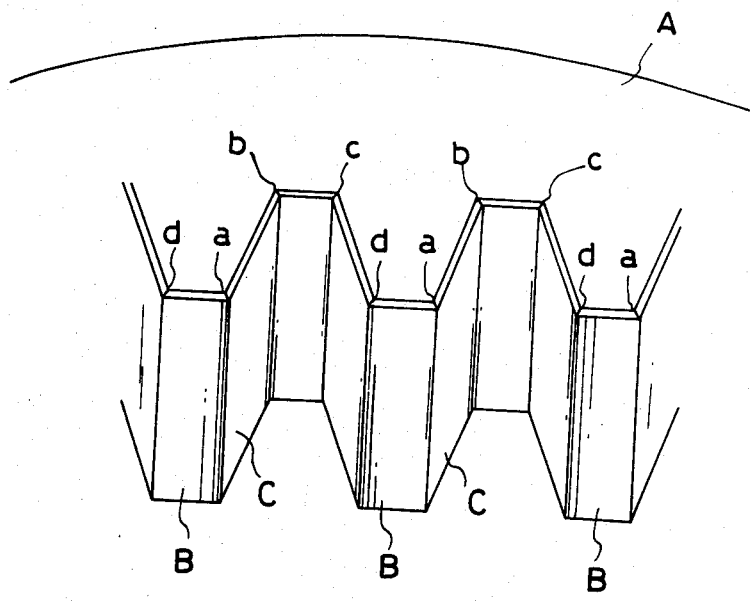
Figure 12:
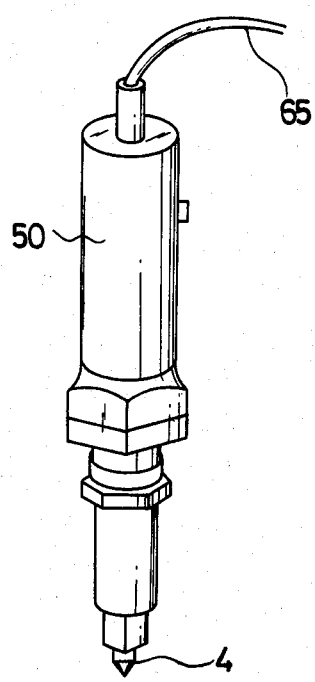
FIG. 12 is a perspective view showing a chamfering tool of the same chamfering machine.

The holder 48, as shown in FIGS. 5 and 7, has a cylindrical shape as shown in FIG. 11. A chamfering tool 50 as shown in FIG. 12 can be inserted into the holder 40, as shown in FIGS. 1 and 9. The chamfering tool 50 has an axial groove or slit 51 formed in an upper end portion. It is also provided with a support portion 52 integral with its lower end. A guide roller 53 is rotatably mounted in an end portion of the support portion 52.

As shown in FIG. 9, a bearing 52 is rotatably mounted on the outer periphery of the holder 48. A coupling plate 53 is secured to the bearing 52. As shown in FIG. 5, the coupling plate 53 is secured by set screws 55 to four slots 54 formed in the crank frame 32. Thus, when the crank wheel 40 is rotated to rotate the crank frame 32, the holder 48 is rotated. The coupling plate 53 can be moved along the slot 54 by releasing the set screws 55. This movement adjusts the mounting position of the coupling plate 53 with respect to the crank frame 32. This adjustment is done in conformity to the thickness of the work A.

The chamfering tool 50 shown in FIGS. 1 and 9 has a shape as shown in FIG. 12. The chamfering tool 50 accommodates a cutter moving motor. With the rotation of the cutter moving motor, a cutter 4 provided at the lower end of the chamfering tool 50 is rotated. The cutter 4, as shown in FIGS. 4 and 9, is provided above and aligned to the guide roller 53.

As the cutter 4 an end mill, a diamond grinder, a grindstone, etc. may be used.

The chamfering tool 50 inserted into the holder 48 as shown in FIG. 9, is inserted to the holder 48 by a tightening ring 56 mounted on the edge of the holder 48. Since the holder 48 has the axial groove or slit 51, its diameter is reduced to clamp the chamfering tool 50 by making a bolt 57. By loosing the bolt 57, the clamp of the chamfering tool 50 is loosened. The amount of chamfering may be varied by varying the height of the cutter 4 by varying the extent of insertion of the holder 48 into the molding tool 50.

Designated at 60 in FIGS. 4, 5 and 9 is a guide. The guide 60 serves to guide the guide roller 53 along the tooth surface C of the teeth B as shown in FIG. 13. The guide 60 is rotatably mounted by a pin 61 on the main frame 5 as shown in FIGS. 5 and 9, and it is spring biased by a spring 62 toward the teeth B of the work to be in contact with a hill of the teeth.

Designated 63 in FIG. 5 is a limit switch. The limit switch 63 is mounted on the main frame 5. Every time the crank frame 32 completes one rotation, the limit switch 63 is turned on and off by being flapped by a dog 64 mounted on the coupling section 34 of the frame.

Designated at 65 in FIG. 1 is a power supply code for supplying power to the cutter drive motor. As shown in FIG. 1, the power code 65 is connected to a power source connector 66 with the chamfering tool 50 inserted in the holder 48.

Figure 3:
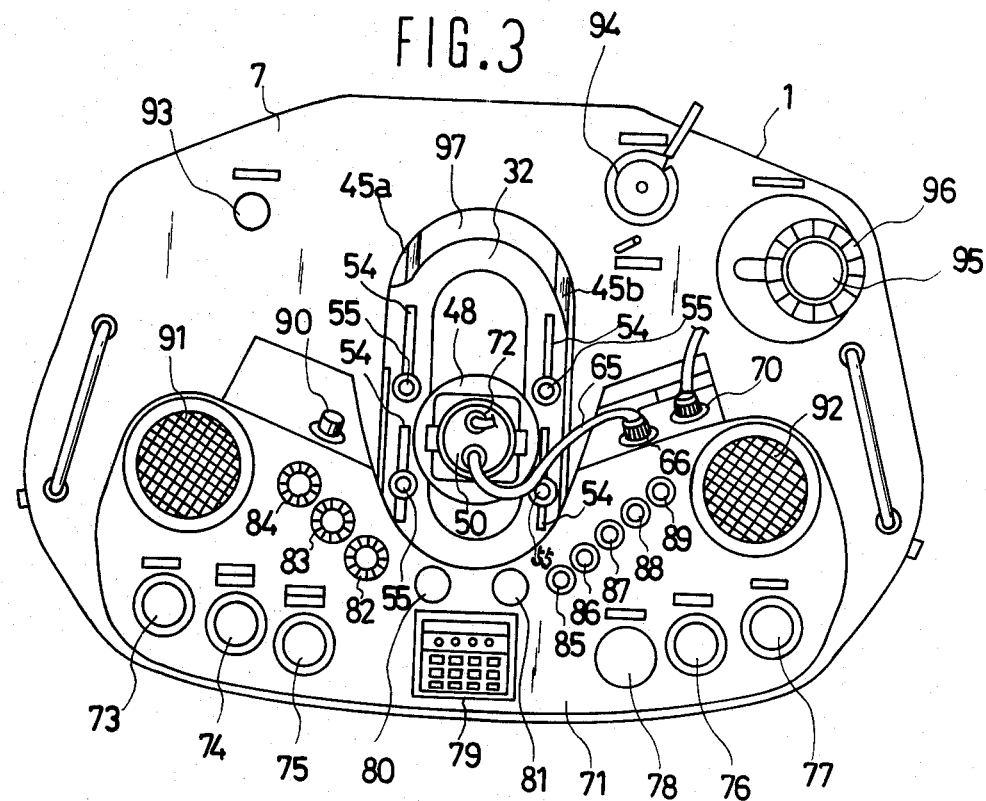
FIG. 3 is a plan view showing an embodiment of the automatic chamfering machine according to the invention.

Designated at 70 in FIG. 3 is a power source connector, at 71 a control panel, and at 72 a cutter drive snap switch.

Designated at 73 in FIG. 3 is a main frame moving push button switch, at 74 a forward cutter moving push button, at 75 a reverse cutter moving push button, at 76 an operation start puch button, at 77 an operation stop push button switch, and at 78 an emergency stop push button switch.

Designated at 79 is a preset counter, and at 80 and 81 timers.

The timer 80 is rendered operative when the cutter 4 is moved to a new tooth after completing the chamfering of the preceding tooth. In other words, the timer 80 provides a time until the positioning roller 10 is pushed out from a tooth groove and falls in the next tooth groove after the movement of the automatic chamfering machine 1 has been started.

The timer 81 generates a signal for starting the movement of the cutter (i.e., start of cutting) after the lapse of a predetermined period of time from the end of movement of the automatic chamfering machine 1.

Designated at 82 in FIG. 3 is a cutter rotation number adjustment dial, at 83 a cutter speed adjustment dial, and at 84 a main frame speed adjustment dial.

Designated 85 in FIG. 3 is a cutting zero display lamp, at 86 a core position display lamp, at 87 a deddendum position display lamp, at 88 an operation display lamp, and 89 a power source connection display lamp.

Designated at 90 in FIG. 3 is a fuse holder, at 91 and 92 solenoid cooling fans, at 93 a tooth core position detection dial, at 94 an addendum position detection dial, at 95 an indexing rubber roller setting dial, and at 96 a deddendum position detection dial.

(Operation)

The automatic chamfering machine according to the invention is used as follows.

When the operation start push button switch 76 is depressed, the solenoid cooling fans 91 and 92 shown in the same Figure are driven, and at the same time the solenoids 3a and 3b shown in FIG. 6 are energized to be attracted to the outer periphery of the work A. At the time time, the cutter moving motor M2 shown in FIG. 5 and cutter rotation motor in the chamfering tool 50 are started.

When the cutter rotation motor is started, the cutter 4 is rotated.

When the cutter moving motor M2 is started, the crank wheel 40 is rotated via the chain 44 shown in FIG. 5. The rotation of the crank wheel 40 is transmitted to the crank frame 32 via the connection pin 41. Since the chamfering tool 50 is secured to the crank frame 32 via the holder 48, the circular motion of the connection pin 41 is transmitted as a circular motion (correctly an elliptical motion due to a support mechanism of the crank frame) to the cutter rotation motor in the chamfering tool 50. However, since the connection pin 41 and connection piece 36 are spring biased in both left and right directions by the springs 37a and 37b as shown in FIG. 5, when the leftward or rightward movement of the crank frame 32 is suppressed, the positional relation between the connection pin 41 and crank frame 32 is deviated to the corresponding extent. Thus, although the cutter 4 provided under the cutter rotation motor and guide roller 53 disposed beneath the cutter 4 are operated in an aligned state and in unison with each other, the guide roller 53 executes a circular motion in contact with the tooth surface C of the work as shown in FIG. 13. Thus, the leftward or rightward movement is suppressed by the tooth surface C, and the movement in the vertical direction coincides with the movement of the crank frame 32.

FIG. 13 illustrates the above operation. Assuming that the automatic chamfering machine according to the invention is operated idly without placing it on the work A, the guide roller 53 executes a circular motion passing points a, b, c, d and e and back to a. When the automatic chamfering machine is placed on the work A to perform a chamfering operation, the guide roller 53 is guided by the guide 60 to enter a tooth groove of the work A and rolls over the tooth surface C past points a, f, c, g and e and back to a. At this time, the guide roller 53 rolls over the tooth surface C in a state urged against the tooth surface C with a force equal to the compression force of the springs 37a and 37b. With this movement, the cutter 4 is moved along the tooth surface C for chamfering.

When the crank arm 32 shown in FIG. 5 is moved to a predetermined position, the dog 64 mounted on the arm 32 is brought into contact with the movable contact of the limit switch 63, so that the switch 63 is turned on. A signal is thus supplied to the preset counter 79 shown in FIG. 3 for counting the number of chamfered teeth.

When the limit switch 63 is operated, the cutter rotation motor and cutter moving motor M2 are stopped. When these motors are stopped, the chamfering machine moving motor M1 shown in FIG. 5 is started to move the drive rollers 2a and 2b and positioning roller 10 through the chain 15. The chamfering machine is thus moved to the next tooth. At this time, the positioning roller 10 rides on the hill of tooth, so that the roller 10 is pushed outwardly. In consequence, the movable contact piece 28 of the limit switch 27 shown in FIG. 5, mounted in the swing arm 11 carrying the roller 10, is brought into contact with the dog 29 secured to the main frame 5, thus operating the limit switch 27 to render the timer 80 operative.

After the lapse of a predetermined period of time from the instant when the timer 80 is rendered operative, the chamfering machine moving motor M1 is stopped so that the automatic chamfering machine is positioned at the next chamfering position. When the automatic chamfering machine is stopped, the swing arm 11 carrying the positioning roller 10 is strongly pulled by the spring 14 so that the positioning roller 10 enters the next tooth groove. As a result, the movable contact piece 28 of the limit switch 27 is separated from the dog 29 to turn off the limit switch 27.

When the limit switch 27 is turned off, the timer 81 shown in FIG. 3 is rendered operative, and after the lapse of a time preset in the timer the cutter rotation motor and cutter moving motor M2 (FIG. 5) are started. The guide roller 53 thus is moved again along the tooth surface, and the cutter 4 is rotated as it is moved along the tooth surface to effect the chamfering of the next tooth.

The sequence of operation described above is repeatedly performed to chamfer each tooth. Every time the chamfering of one tooth is completed, the dog 64 is brought into contact with the limit switch 63 to turn on the switch 63. As a result, a signal is supplied to the preset counter 79, thus incrementing the count of the preset counter representing the number of the chamfered teeth by one. When the chamfering of all the teeth is completed so that the preset count of the preset counter 79 is reached, the operation of the chamfering machine is automatically stopped.

Prior to the chamfering, times are preset in the timers 80 and 81. If the time preset in the timer 80 is insufficient, a stop signal is generated before the positioning roller 10 enters a tooth groove after it is pushed out from the preceding tooth groove. In this case, the chamfering machine is stopped before it reaches the intended position, so that the automatic operation is stopped. When a preset time is excessive, no signal is generated even after the tooth groove is passed, and the machine is stopped with generation of a signal after the tooth groove has been passed. In such a case, the chamfering machine is stopped for every other tooth so that all the teeth cannot be chamfered. The times of the timers 80 and 81 are preset such that the chamfering machine is stopped just for each tooth.

The timer 81 generates a signal for starting the movement of the cutter (i.e., starting the cutting) after the automatic chamfering machine is moved for one tooth. The time preset in the timer 81 is longer than the preset time of the timer 80 by 0.1 to 0.2 second.

When the operation stop push button switch 7 is depressed, the power source is stopped to deenergize the sonoids 3a and 3b. Also, the cutter rotation motor and cutter moving motor M2 are stopped.

The machine moving motor M1 is started when the main frame moving push button 73 is stopped and is driven to move the chamfering machine while the switch 73 is held depressed.

The cutter 4 is started when the forward cutter moving push button switch 74 is depressed and is moved forwardly along the tooth surface while the switch 74 is held depressed. The cutter 4 is started when the reverse cutter moving push button switch 75 is depressed and is moved reversely while the switch 75 is held depressed.

When the emergence stop push button switch 78 is depressed, a power source circuit is disconnected, and all the operation is stopped.

ADVANTAGES OF THE INVENTION

The automatic chamfering machine according to the invention has the following advantages.

(1) The automatic chamfering machine according to the invention is intermittently moved along the work at a pitch corresponding to the tooth pitch to perform the chamfering of the successive teeth automatically. The automatic chamfering can be obtained by merely setting the machine on the work. The operation thus can be facilitated, and the operation efficiency can be improved.

(2) The chamfering operation can be obtained with a reduced number of personnel and with improved efficiency, so that it is possible to reduce man-hour and rationalize the operation.

(3) The cutter can be moved faithfully along the tooth surface, so that it is possible to obtain highly accurate chamfering.

(4) Since it is necessary only to set the automatic chamfering machine on the work, no skill is necessary for chamfering, and the operation can be readily conducted by a person without any skill.

(5) No large drive mechanism for setting the work on the operating table and rotating the work is needed, and also a complicated operation can be attained with a simple construction. Thus, the automatic chamfering machine according to the invention can be reduced in size and weight, its handling is simplified, and its price can be reduced compared to the prior art chamfering machine.

(6) Since the automatic chamfering machine is moved along the work, highly accurate chamfering can be obtained even if the work is not held accurately horizontally.

(7) Since the cutter is moved faithfully along the tooth surface, even a non-circular work, e.g., an elliptical work or a polygonal work, can be processed for chamfering provided the work has a fixed tooth or slit pitch.

It is to be understood that the above embodiment is by no means limitative, and various changes and modifications can be made without departing from the scope and spirit of the invention.

What is claimed is:

1. An automatic chamfering machine comprising:
   at least one drive roller including magnetic means to be magnetically attracted to a work having peripheral teeth or slots;
   a machine moving motor for intermittently moving said drive roller and said chamfering machine along said work;
   a positioning roller to be intermittently received in tooth grooves or slots of said work for every tooth or slot to effect positioning of said chamfering machine at a stop position;
   a cutter for chamfering the edge of the tooth or slot of said work;
   a cutter rotation motor for rotating said cutter;
   a guide roller for guiding said cutter;
   a cutter moving motor and a crank mechanism for moving said guide roller along a tooth surface or slot surface of said work to thereby move said cutter along the tooth surface or slot surface of said work; and
   a guide for guiding said guide roller to a tooth surface or slot surface of said work.

* * * * *